United States Patent
Markel

(10) Patent No.: US 6,760,043 B2
(45) Date of Patent: Jul. 6, 2004

(54) SYSTEM AND METHOD FOR WEB BASED ENHANCED INTERACTIVE TELEVISION CONTENT PAGE LAYOUT

(75) Inventor: Steven O. Markel, Highlands Ranch, CO (US)

(73) Assignee: Intellocity USA, Inc., San Francisco, CA (US)

(*) Notice: Subject to any disclaimer, the term of this patent is extended or adjusted under 35 U.S.C. 154(b) by 512 days.

(21) Appl. No.: 09/935,492

(22) Filed: Aug. 23, 2001

(65) Prior Publication Data

US 2002/0087986 A1 Jul. 4, 2002

Related U.S. Application Data

(60) Provisional application No. 60/227,930, filed on Aug. 25, 2000, provisional application No. 60/227,063, filed on Aug. 21, 2000, and provisional application No. 60/227,918, filed on Aug. 25, 2000.

(51) Int. Cl.[7] .............................. G06F 3/14; H04N 7/00
(52) U.S. Cl. ....................... 345/717; 345/760; 345/719; 345/762; 345/763; 715/512; 715/500.1; 715/513; 725/37; 725/135; 725/141; 717/113
(58) Field of Search .............................. 345/717, 760, 345/764, 719, 723, 726, 716, 731, 732, 730, 762, 763, 765; 715/512, 513, 500.1, 501.1, 517, 526, 530, 901; 717/110, 113, 120, 121, 101, 136, 138; 725/37, 105, 109, 110, 112, 135, 139, 141, 151, 153

(56) References Cited

U.S. PATENT DOCUMENTS

| | | | |
|---|---|---|---|
| 5,467,288 A | 11/1995 | Fasciano et al. | 364/514 R |
| 5,524,193 A | 6/1996 | Covington et al. | 395/154 |
| 5,583,980 A | 12/1996 | Anderson | 395/173 |
| 5,600,775 A | 2/1997 | King et al. | 395/806 |
| 5,613,909 A | 3/1997 | Stelovsky | 463/1 |
| 5,631,903 A | 5/1997 | Dianda et al. | 370/401 |
| 5,655,144 A | 8/1997 | Milne et al. | 395/807 |
| 5,680,639 A | 10/1997 | Milne et al. | 395/806 |

(List continued on next page.)

FOREIGN PATENT DOCUMENTS

| | | | |
|---|---|---|---|
| GB | 2327837 | 3/1999 | |
| JP | 10042271 | 2/1998 | H04N/7/173 |
| JP | 227851 A | 8/2000 | H04N/7/173 |
| WO | WO99/35832 | 7/1999 | |
| WO | WO 00/49520 | 8/2000 | |
| WO | WO 01/28235 A1 | 4/2001 | H04N/5/445 |

OTHER PUBLICATIONS

International Search Report from Ladas & Parry, Jun. 2, 2002.

Chambers, C.S.: "Designing a set–top box operating system", International Conference on Consumer Electronics—*Digest of Technical Papers* Rosemont, Jun. 7–9 1995, New York, IEEE US vol. CONF. 14, Jun. 7, 1995, pp. 368–369 XP000547858 ISBN 0–7803–2141–3 p. 76, col. 1, paragraph 7.2.1C.

(List continued on next page.)

*Primary Examiner*—Raymond J. Bayerl
(74) *Attorney, Agent, or Firm*—Morrison & Foerster LLP

(57) ABSTRACT

A system and method for creating a platform independent enhancement file for television employs a web based editor with local functions for repositioning and sizing of displayable elements. Elements comprise text, graphics, images, or imported HTML files. Trigger information associated with elements controls the time and actions performed when rendering the displayable elements. A database comprises data representing elements, element attributes, trigger information and project information. A file generation process queries the database and produces a platform independent XML compatible script file. The script file may be parsed and the resultant HTML/Javascript file may be previewed employing a web browser. The script file may be parsed with other tools to provide HTML files for specific platforms without modification of the script file.

37 Claims, 16 Drawing Sheets

U.S. PATENT DOCUMENTS

| | | | | | |
|---|---|---|---|---|---|
| 5,708,845 | A | * | 1/1998 | Wistendahl et al. | 715/500.1 |
| 5,929,849 | A | | 7/1999 | Kikinis | 345/327 |
| 5,931,908 | A | | 8/1999 | Gerba et al. | 709/219 |
| 5,951,639 | A | | 9/1999 | MacInnis | 348/6 |
| 6,006,241 | A | | 12/1999 | Purnaveja et al. | 707/512 |
| 6,006,256 | A | | 12/1999 | Zdepski et al. | 709/217 |
| 6,057,833 | A | * | 5/2000 | Heidmann et al. | 345/726 |
| 6,154,771 | A | | 11/2000 | Rangan et al. | 709/217 |
| 6,173,317 | B1 | | 1/2001 | Chaddha et al. | 709/219 |
| 6,230,172 | B1 | | 5/2001 | Purnaveja et al. | 707/512 |
| 6,551,357 | B1 | * | 4/2003 | Madduri | 715/512 |
| 6,560,777 | B2 | * | 5/2003 | Blackketter et al. | 725/110 |
| 2001/0011375 | A1 | | 8/2001 | Yun | 725/107 |

OTHER PUBLICATIONS

Jose Alvear: "Realnetworks' Realaudio and Realvideo", *Web developer.com*, guide to streaming multimedia, New York: John Wiley & Sons, U.S, 1998, XP002150113, ISBN:0–471–24822–3.

Anonymous, "HTML 4.0 Specification", W3C Recommendation, Apr. 24, 1998, XP002191626, the whole document.

"MPEG–4 Authoring Tools let Pros, Consumers Create Multimedia for Web Pages, TV HDTV", Sarnoff Document, Dec. 10, 1998, XP002155140, the whole document.

Fernandez Panadero MC et al.: "Mass–customizing electronic journals", *Online!*, May 10, 1999, XP002177409.

Shim Ssy et al: "Template based synchronized multimedia integration language authoring tool", proceedings of the Spie, Spie, Bellingham, VA, US vol. 3964, Jan. 2000, pp. 134–142, XP000986660 the whole document.

Li Q; Ozsoyoglu, ZM; Wagner, R; Kambayashi, Y; Zhang, Y: "XML based text TV", *Proceedings of Wise*, 2000, Jun. 19–21, 2000, XP002192977, Hong Kong, China.

PCT International Search Report from Ladas & Parry, Mar. 26, 2002.

PCT International Search Report from Ladas & Parry, Apr. 2, 2002.

PCT International Search Report from Ladas & Parry, May 15, 2002.

U.S. patent application Ser. No. 09/933,927, filed Aug. 21, 2001, System and Method for Distribution of Interactive Content to Multiple Targeted Presentation Platforms—by Steven O. Markel.

U.S. patent application Ser. No. 09/941,246, filed Aug. 27, 2001, Method of Enhancing Streaming Media Content—by Steven O. Markel.

* cited by examiner ly included
SYSTEM AND METHOD FOR WEB BASED ENHANCED INTERACTIVE TELEVISION CONTENT PAGE LAYOUT

CROSS REFERENCE TO RELATED APPLICATIONS

This application is based upon and claims priority of U.S. provisional application serial No. 60/227,930, entitled "SYSTEM AND METHOD FOR WEB BASED ENHANCED INTERACTIVE TELEVISION CONTENT PAGE LAYOUT", filed Aug. 25, 2000 by Steve O. Markel; U.S. provisional application serial No. 60/227,063, entitled "A DATA DRIVEN SYSTEM AND METHOD FOR DISTRIBUTION OF INTERACTIVE CONTENT TO MULTIPLE TARGETED PRESENTATION PLATFORMS" filed Aug. 21, 2000 by Steven O. Markel, and U.S. provisional application serial No. 60/227,918, entitled "METHOD OF ENHANCING STREAMING MEDIA CONTENT" filed Aug. 25, 2000 by Steven O. Markel, the entire disclosure of which is herein specifically incorporated by reference for all that it discloses and teaches.

BACKGROUND OF THE INVENTION a. Field of the Invention

The present invention relates to interactive and enhanced television and, more particularly, to a method and system of creating enhancement content that may be displayed in conjunction with a television program.

b. Description of the Background

A television program may be accompanied by additional information employed to enhance the program or to provide viewer interaction. Enhancements have historically included closed captioning and multilingual support. Advances in networking, computer systems, and video production have increased the number and types of enhancements that may be provided with a program or advertisement. Enhancements may include stock updates, news stories, Internet links, weather forecasts, bulletins, statistics, trivia, and other information. For example, a football game may include icons allowing viewing of team players, statistics, trivia and other information such as upcoming games. Further, the advent of set-top-boxes, as may be used in cable and satellite television systems, allows enhancement information to be presented in new ways, such as screen overlays and in windows, for example.

Enhanced television content may employ a combination of HTML (hypertext markup language), JavaScript, Java and other formats common to Internet page display. An enhanced display may comprise text, icons, graphics and images placed at locations on or in proximity to the television image. To produce an enhanced display, an author must create a file identifying each displayed element (such as text, icons, graphics and images), the location where each element is displayed, and the starting time a duration for which an element or group of elements is displayed. Previous methods employed to enter parameters required to generate and position the elements comprising the layout of enhanced pages have involved manually entry. The resultant application program may require compilation and execution in order to view the resultant image or images. This may be an iterative process, requiring multiple compilations before a desired result is obtained. Such iterative processes may be costly and time consuming.

Additionally, due to the numerous differences between presentation platforms, such as set top boxes, satellite receivers, computers, or interactive televisions, content providers have historically been required to target a specific platform in the development of an application. In order to provide support for each additional platform, the interactive content provider must introduce potentially significant modifications to the existing application, resulting in the ongoing maintenance of multiple code bases and adding to the time and cost required to produce enhanced page layouts for multiple platforms. Further, web page design tools, such as FrontPage™, DreamWeaver™, and others, do not support administrative capabilities nor do they support databases. Therefore a new method of creating enhanced content that allows utilization across multiple platforms and provides an accurate preview of enhancements is needed.

SUMMARY OF THE INVENTION

The present invention overcomes the disadvantages and limitations of the prior art by providing an interactive television enhancement authoring method and system allowing simple development of text, graphics, and image display, emulation of the enhancements, and production of a platform independent enhancement file, called iTVML, that may be parsed, using a publisher tool (such as iTV Publisher from Intellocity), to create interactive television enhanced content files specific to a particular platform such as WEBTV™, AOLTV™ or other platforms. An authoring program communicates with a web browser such that the present invention may be utilized locally or across a network.

The invention may therefore comprise a method for creating a television presentation enhancement comprising: defining a window in a graphical user interface; placing a displayable element at a position in the window; defining a time when the displayable element may be rendered; employing a database to store information describing the displayable element and the time; creating a platform independent television enhancement file containing information related to the displayable element and the time; parsing the platform independent television enhancement file to produce an HTML file; and viewing the HTML file.

Software downloaded to the browser provides 'drag and drop' and resizing editing functions at the user's browser, eliminating delays that may be incurred due network latencies and server workload if these functions were implemented at the server. The invention comprises a number of user screens that may be accessed through URLs that provide administrative, project, page, layout, trigger, emulation, and iTVML export. Administrative functions provide user accounts, login, and tutorials. The project and page screens provide access to projects and specific enhancement pages with the projects. The layout page provides an easy to use, user-friendly graphical editing environment where elements such as text, graphics, images, and executable routines may be placed on a video display area (canvas) and may be moved and sized. The trigger functions provide synchronization of the presentation of enhancements to a specified event, such as frame time or presentation duration, for example. The emulation function generates an iTVML file and parses the file for web browser presentation, providing an accurate representation of the enhancement if viewed on a television. The iTVML export function provides generation and saving of an iTVML file.

The invention may therefore further comprise a system for creating television enhancements comprising: a graphical user interface implemented in a web browser environment; a rectangular area defined in the browser environment; a user interface that places a displayable element in the rectangular area; a user interface that specifies a time at which the displayable element may be rendered; a database that stores information associated with the displayable element and information associated with the time; a pointing device; and a user interface that initiates generation of an XML file containing tags for the information associated with the displayable element and the information associated with the time.

Advantageously, the present invention provides an efficient, easy to use system and method for creating television enhancements that produces a platform independent enhancement file. The enhancement file may be emulated using the invention to preview the appearance of the enhancements. The enhancement file may be parsed by other tools to produce platform dependent enhancement files without re-editing, resulting in lower costs to support a range of presentation platforms, and uniformity in the content of the enhancements provided.

DESCRIPTION OF THE FIGURES

In the figures.

DETAILED DESCRIPTION OF THE INVENTION

Figure 1:
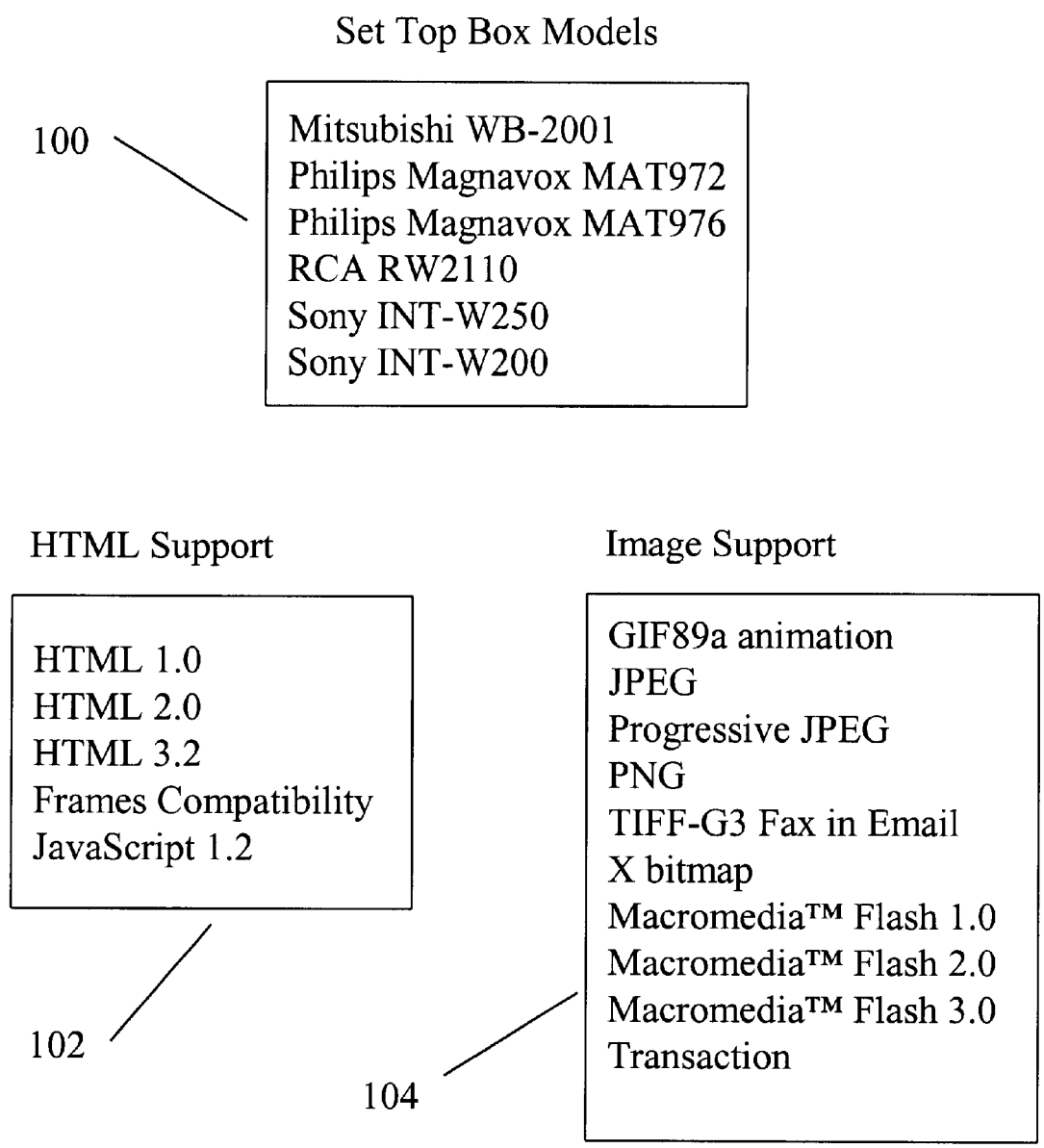
FIG. 1 depicts html and image support for a group of commercially available set top box products.

FIG. 1 depicts HTML and image support for a group of commercially available set top box products. Set top box models 100 provide HTML support 102 and image support 104. HTML support 102 lists support for html 1,0, 2.0, and 3.2 versions. A limitation of HTML is that some versions lack downward compatibility. For example, HTML versions 4 and higher do not support all the tags of HTML 3.2. FIG. 1 serves to illustrate that an HTML based author for creating enhanced content would not be able to support a wide range of target platforms. The present invention overcomes the disadvantages of HTML based authoring by providing an authoring tool that generates an extended XML file, called iTVML, that may be parsed using XSL scripts for each platform type to produce HTML code and Javascripts suitable for each platform. Through the use of the iTVML author of the present invention, enhancements need only be authored once, and then XSL scripts specific to each set top box, or types of set top boxes may be applied, thereby preserving the investment in authoring by not requiring changes for each platform.

Figure 2:
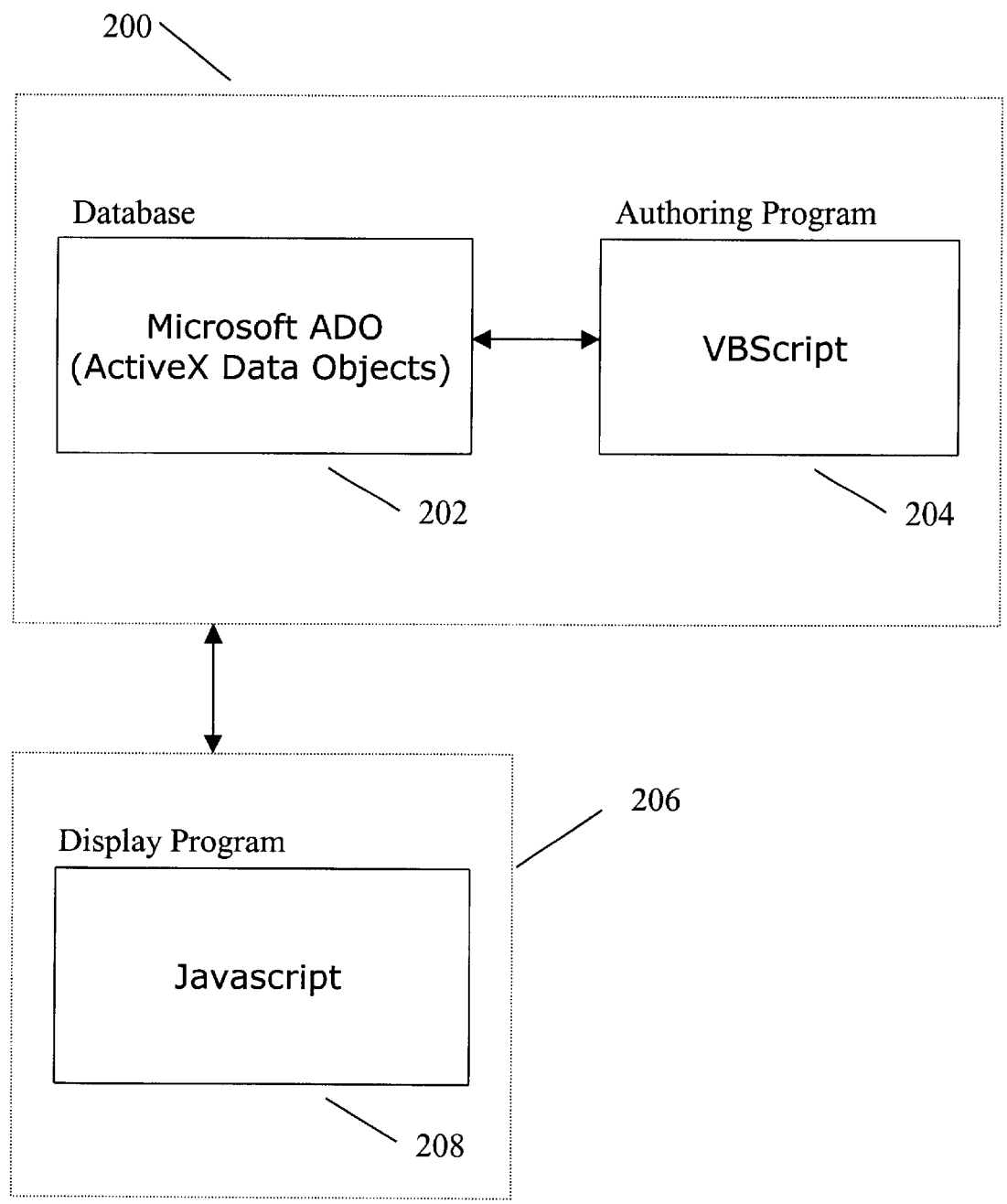
FIG. 2 depicts the software environment of the present invention.

FIG. 2 depicts the software environment of the present invention. Authoring components 200 comprise database 202 and authoring program 204. Rendering component 206 comprises a display program 208 that may be viewed employing a browser display utility such as Microsoft Internet Explorer. Database 202 may comprise Microsoft ADO (ActiveX Data Objects) from Microsoft Corporation. ActiveX is a set of programming rules that allows the output of other applications, such as spreadsheets and word processors for example, to be viewed in web browser formats. Authoring program 204 may employ a programming environment such as VBScript. Visual Basic Scripting Edition (most commonly referred to as VBScript) is a subset of Microsoft Visual Basic. Display program 208 may comprise Javascript components. JavaScript is a scripting language that allows lines of Java code to be inserted into HTML scripts. Java is an object oriented programming language created by Sun Microsystems. Java is a device independent language, meaning that programs compiled in Java can be run on any computer. Java programs can be run as a free-standing application or as an applet placed on a web page. Applets written in Java may be served from a web site and executed on a client computer. For example, a JavaScript function may be employed to verify that users enter valid information into a form requesting a user ID and password. Without any network transmission, an HTML page with embedded JavaScript can interpret the entered text and alert the user with a message dialog if the input is invalid. Further, JavaScript statements embedded in an HTML page can recognize and respond to user events such as mouse clicks, form input, and page navigation. Such response may comprise execution of an applet, communication with a browser plug-in, or other action.

Figure 3:
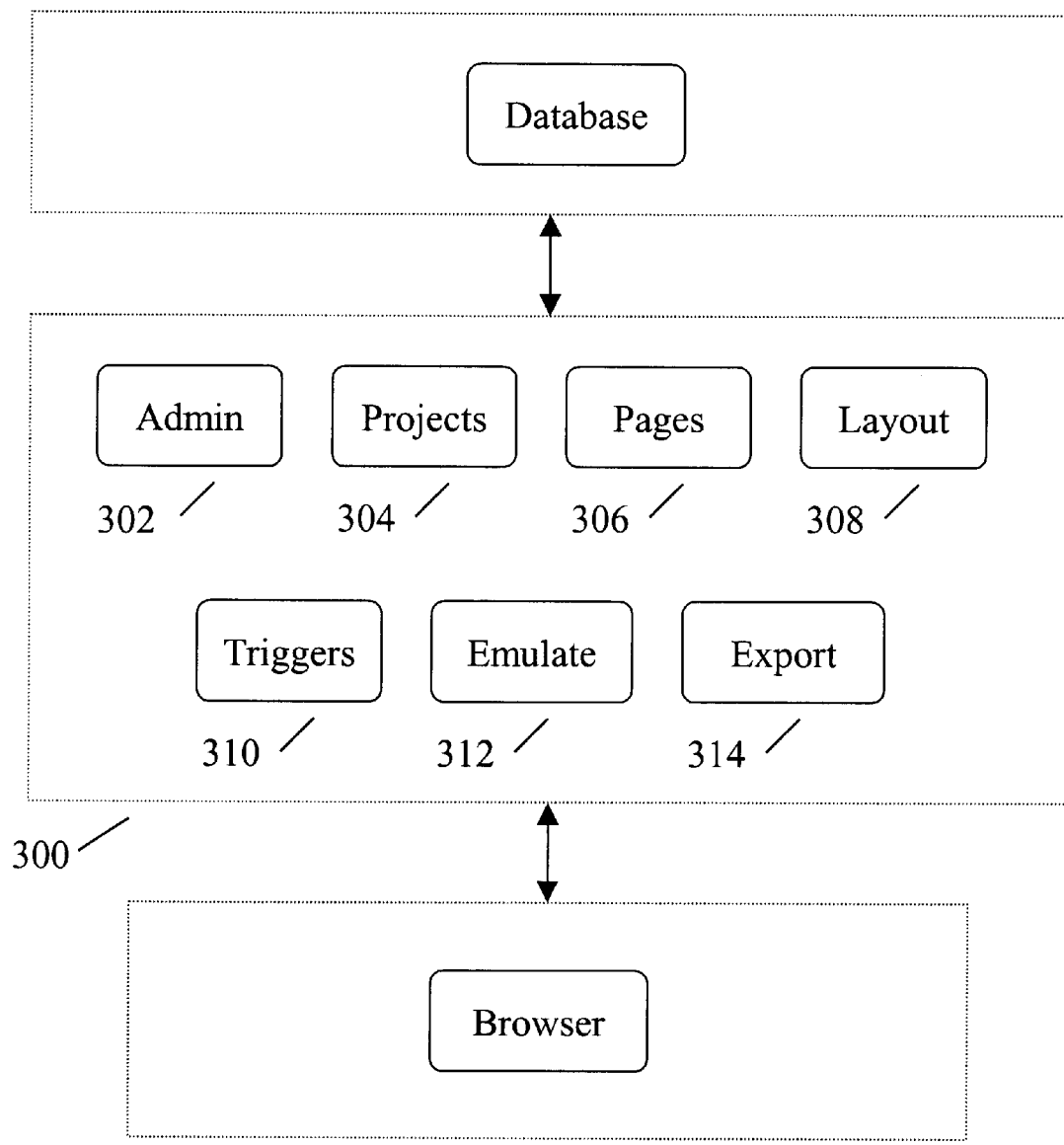
FIG. 3 depicts software components of the authoring program.

FIG. 3 depicts components of authoring program 204 shown in FIG. 2. Authoring program 300 comprises administration module 302, projects module 304, pages module 306, layout module 308, triggers module 310, emulation module 312 and export module 314. Each of the aforementioned modules may be accessed employing a browser and a URL Universal Resource Locator (URL) identifying the location of the HTML and Javascript code that may be employed to produce each page.

Figure 4:
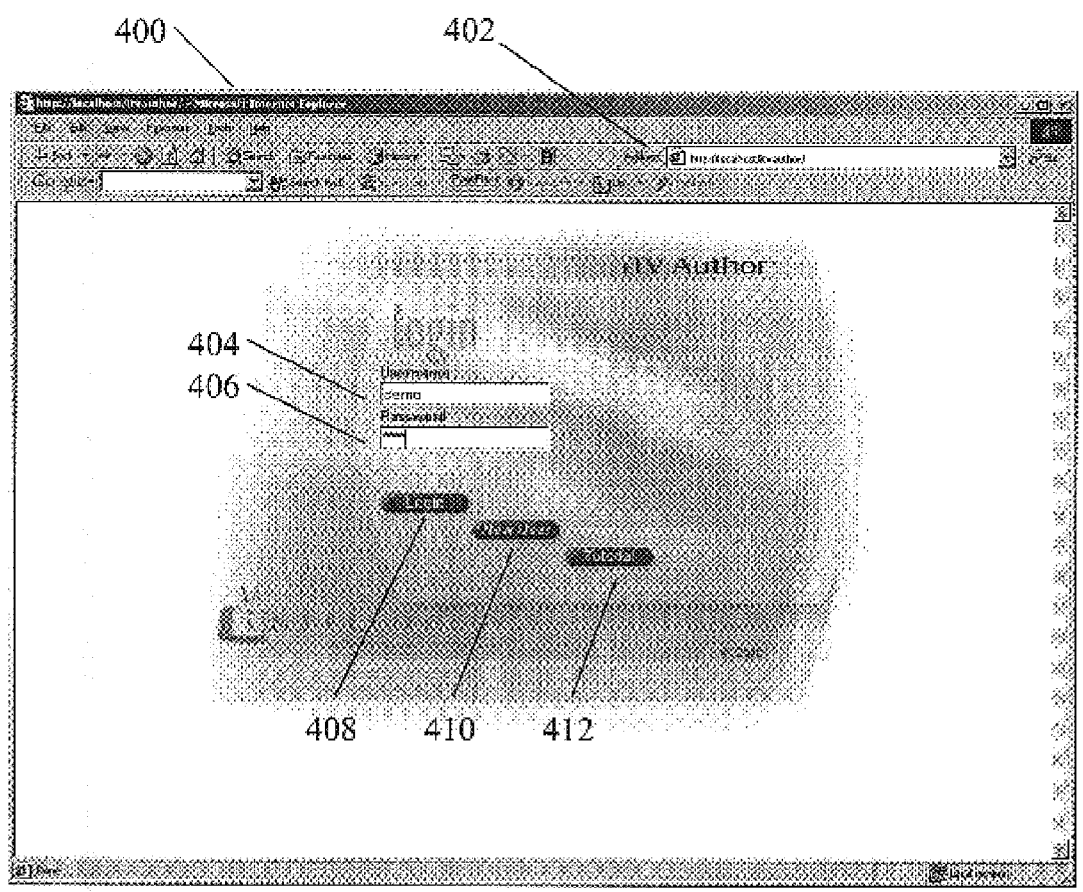
FIG. 4 is a screen depiction of the administration module configured for user login.

FIG. 4 is a screen depiction of the administration module configured for user login. Administration module 400 is accessed via URL 402. Administration module 400 may provide entry of user name 404 and user password 406. The user may select login button 408, new user button 410, or tutorial button 412 to access functions of this module. New user button 410 allows an account to be established for a new user. Tutorial button 412 may be employed to receive information concerning use of the present invention. Once a user has entered a valid username and password, a screen representative of one of the other modules depicted in FIG. 3 may be displayed. The user may navigate between modules by selecting navigation buttons located in each screen.

Figure 5:
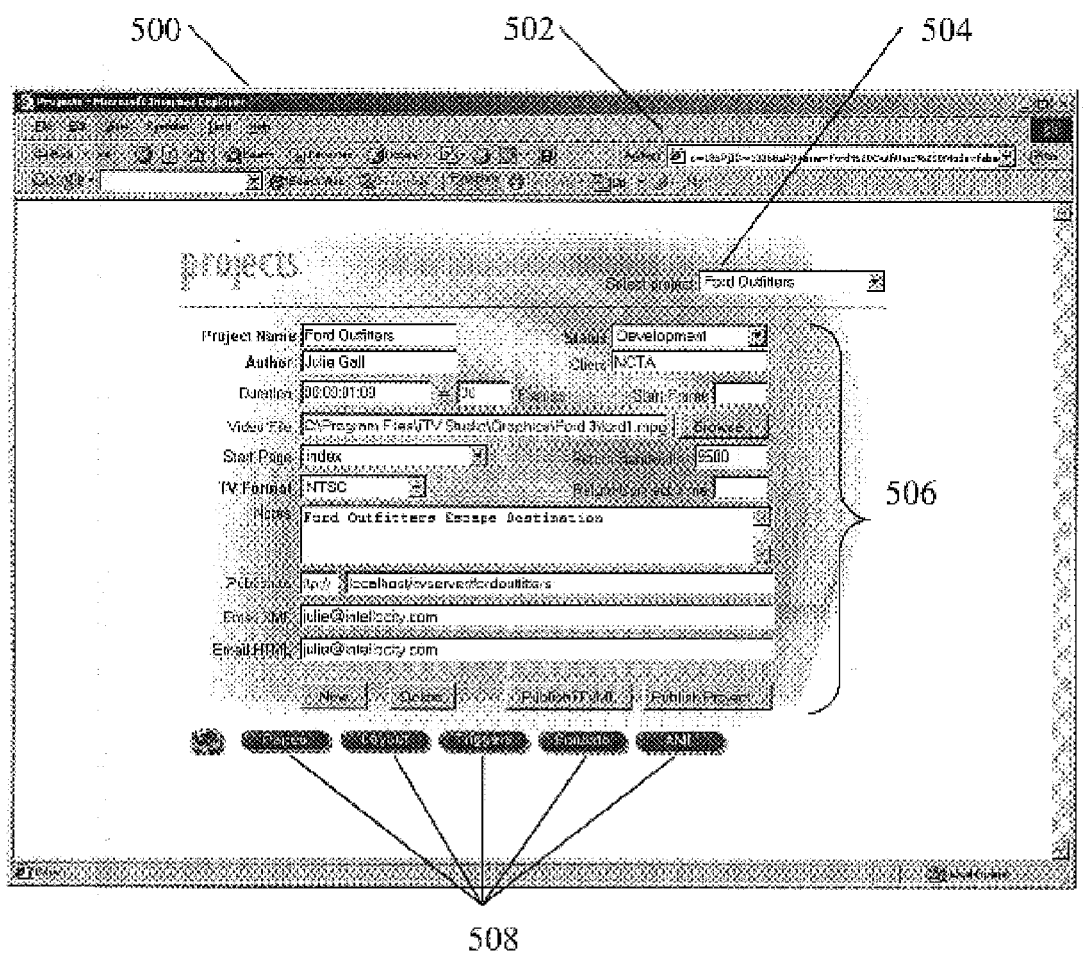
FIG. 5 depicts a projects screen.

FIG. 5 depicts a projects screen. Projects screen 500 may be accessed through URL 502. Projects screen 500 comprises project selector 504, project information and control area 506 and navigation buttons 508. Project selector 504 allows the user to select from existing projects. Control area 506 comprises project information and control buttons.

Project information may comprise a project name, status information to indicate the state of completion of a project, author name, client, duration of the enhancement, the number of frames for which the enhancement is displayed, the start frame, the start page, the video file to which the enhancement may be applied, return bandwidth that indicates the rate at which an enhancement may be delivered, a return connect time indicating latency in establishing a connection, the TV format employed (such as NTSC or PAL), notes concerning the enhancement, a file to which the enhancement may be published, and email addresses for XML and HTML code. Control area 506 may comprise buttons that allow selection of a new project (and saving of the current project), deletion of a project, publishing of an iTVML file and publishing of the project. Navigation buttons 508 allow the user to switch between screens of the invention. When a user navigates from the projects screen to another screen, information associated with the projects screen may be saved to a database.

Figure 6:
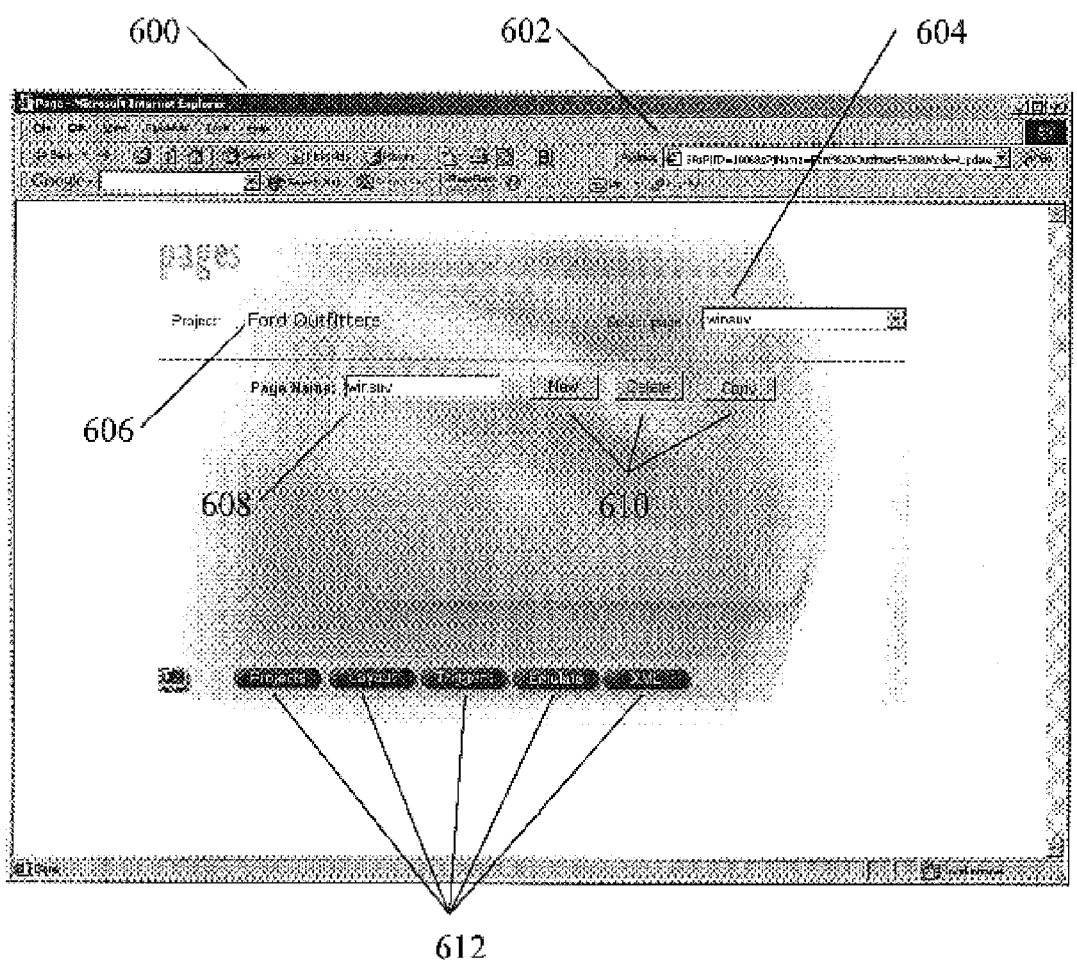
FIG. 6 depicts a pages screen.

FIG. 6 depicts a pages screen. For each project there may be one or more pages. Pages screen 600 may be accessed through URL 602. Project 606 shows the project name. Page select 604 provides a pull down menu for selection of existing pages. Page name 608 shows the name of a selected page, or the name given to a new page or a copy of another page. A new page may be selected through control buttons 610 that allow a page to be deleted, copied, or for a new page to be created. Navigation buttons 612 allow the user to switch between screens of the invention.

Figure 7:
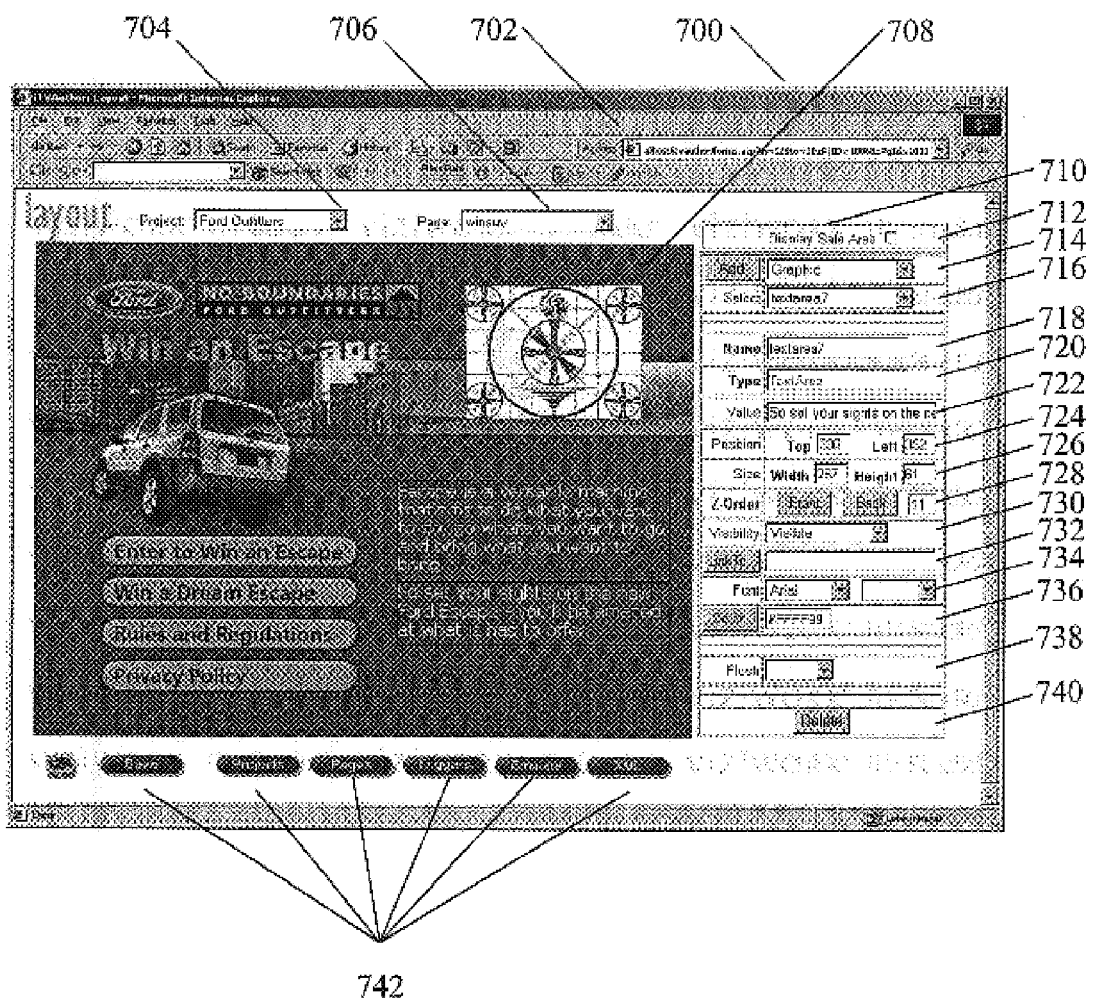
FIG. 7 depicts a layout page screen.

FIG. 7 depicts a layout page screen. Layout screen 700 may be accessed through URL 702. Project selector 704 provides selection of a project. Page selector 706 allows selection of a page in the project. The layout screen further comprises a canvas area 708 that may contain a video frame and enhancement elements, plus properties box 710. Canvas area 708 may be implemented as a window having a width that is a multiple of the pixel width of the video image, eliminating resealing operations. Properties box 710 provides selection of enhancement elements and parameters associated with those elements. Properties box 710 comprises a number of user input areas that are described hereafter with reference to FIG. 7. Display safe area check box 712 provides a reduced size canvas area such that elements on the canvas will not be obscured in some monitors. Element selection menu 714 provides user selection of text, graphic, and image elements, and instance selector 716 allows selection of an instance of the element. Further, element selection menu 714 may be employed to import HTML and Javascript routines created with the present invention or other tools such as HTML authoring software. The 'Add' button of element selection menu 714 may be employed to place an element on canvas 708 once an element and instance have been selected. The selected choices are shown in element name 718 and element type 720. Some elements include user specified values, such as text. Such values may be entered through value entry 722. The position of an element may be entered using position window 724, or the element may be positioned using a mouse or other pointing device as shall be described later. The size of an element may be specified through size entry 726, or element size may be configured using a mouse or pointing device as shall also be described later. Elements may be placed to appear on top of other elements or behind other elements through a Z order value accessed through Z order control 728. The order may be specified in an order box, or the order of a selected element may be adjusted using front and back buttons. The visibility of an element may be selected through visibility control 730. An element may also serve as a link to other information, web pages, or executable programs. The link may comprise a local address, a web address/URL, or other address. A link associated with an element may be specified through link control 732. The font employed in text elements may be specified through font control 734. The color of text and graphics may be selected through color control 736. Flush (placing of an element at the edge of the canvas) may be selected through flush control 738. A selected element may be deleted by selecting delete button 740. Deletion of a selected element may also be performed via keyboard entry. Navigation buttons 742 allow the user to switch between screens of the invention.

Figure 8:
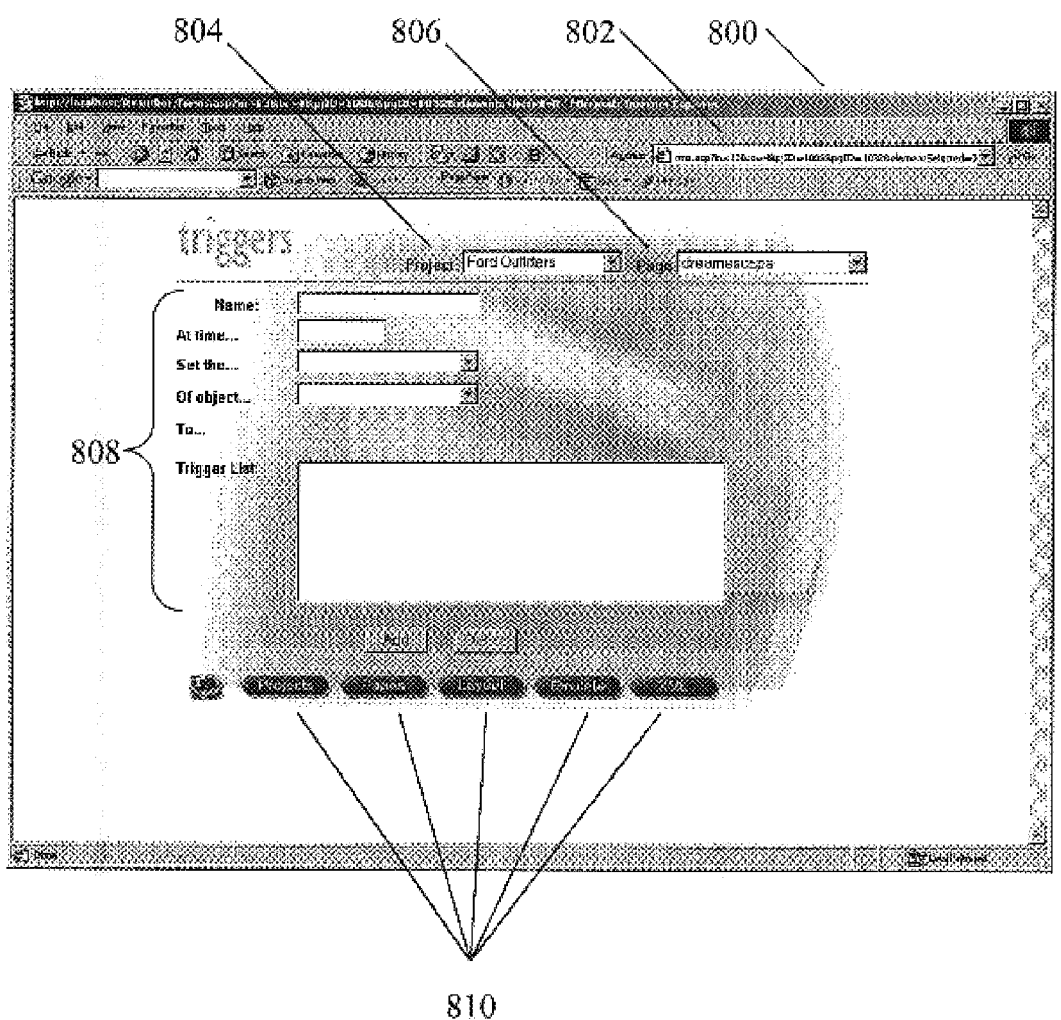
FIG. 8 depicts a triggers screen.

FIG. 8 depicts a triggers screen. Triggers are employed to synchronize the rendering of enhancements with an event, such as a frame number or display time, for example. Triggers screen 800 may be accessed through URL 802. Project select window 804 allows selection of a project and displays the project name. Page selection window 806 allows selection of a page within the project and displays the page name. Trigger controls 808 provide specification of a trigger name, the time at which the trigger may execute, the action to be taken when the trigger time occurs, the element, and a trigger list. For example, at 5 seconds, the text of an element may be changed to provide a welcome message. Triggers may provide a monitoring function downloaded to platform, such as a set top box or interactive television, for example, that then monitors a television program for a specified event. When the specified event occurs, an enhancement file comprising HTML or HTML and Javascript may be executed from platform memory, or may be retrieved using a transport method wherein the downloaded monitoring includes a URL from which the enhancement file may be accessed.

Figure 9:
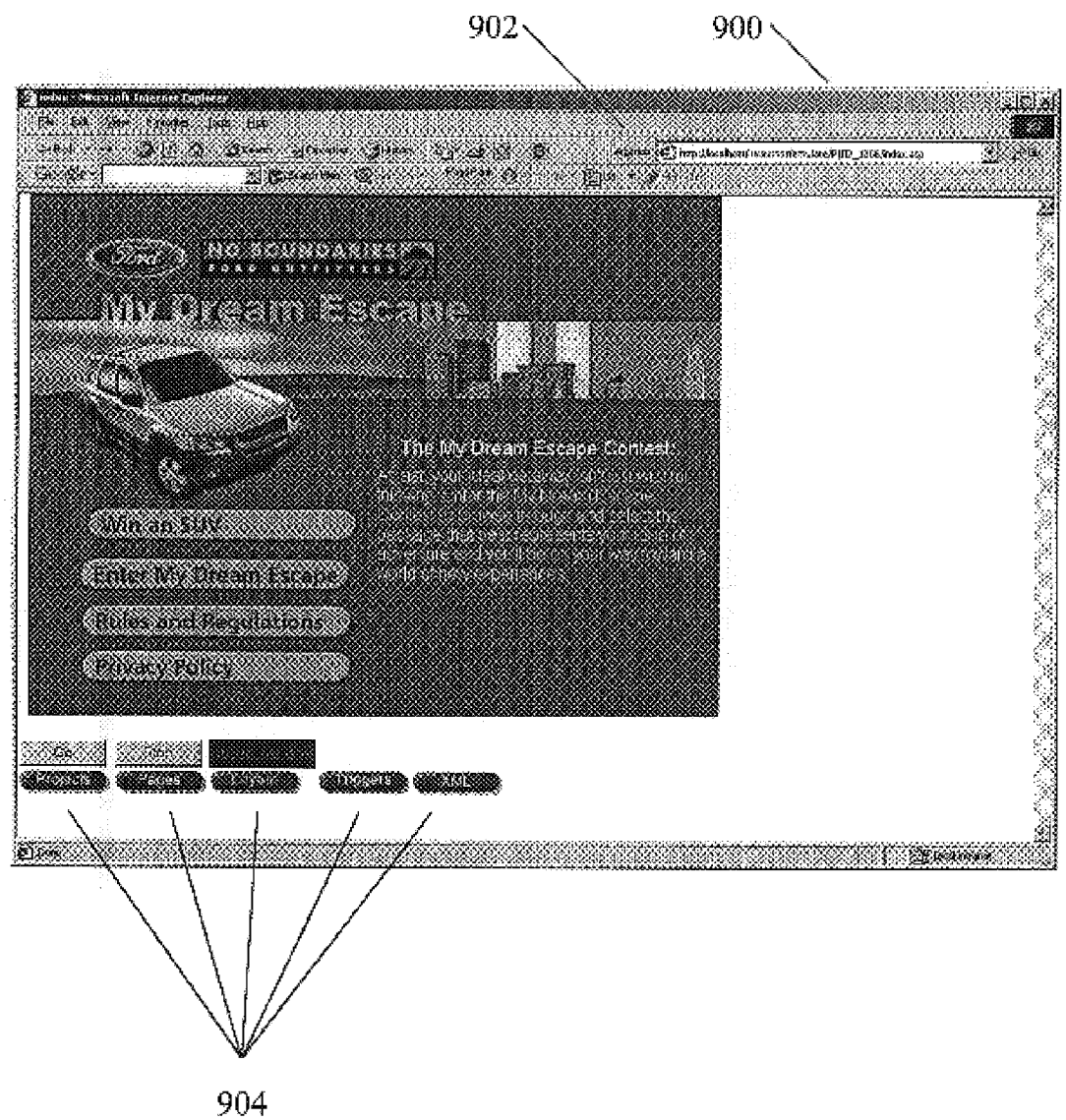
FIG. 9 depicts an emulation screen.

FIG. 9 depicts an emulation screen. Emulation screen 900 may be accessed through URL 902. The emulation screen may be employed to display television images and enhancements as they would appear on a television or other video receiving equipment. The emulation process includes generation of an iTVML file from database information, parses the iTVML file with an XSL parser configured for web browser display, producing an HTML/Javascript output that is then provided to the browser. Generation of iTVML files is described in FIGS. 13 through 16.

Figure 10:
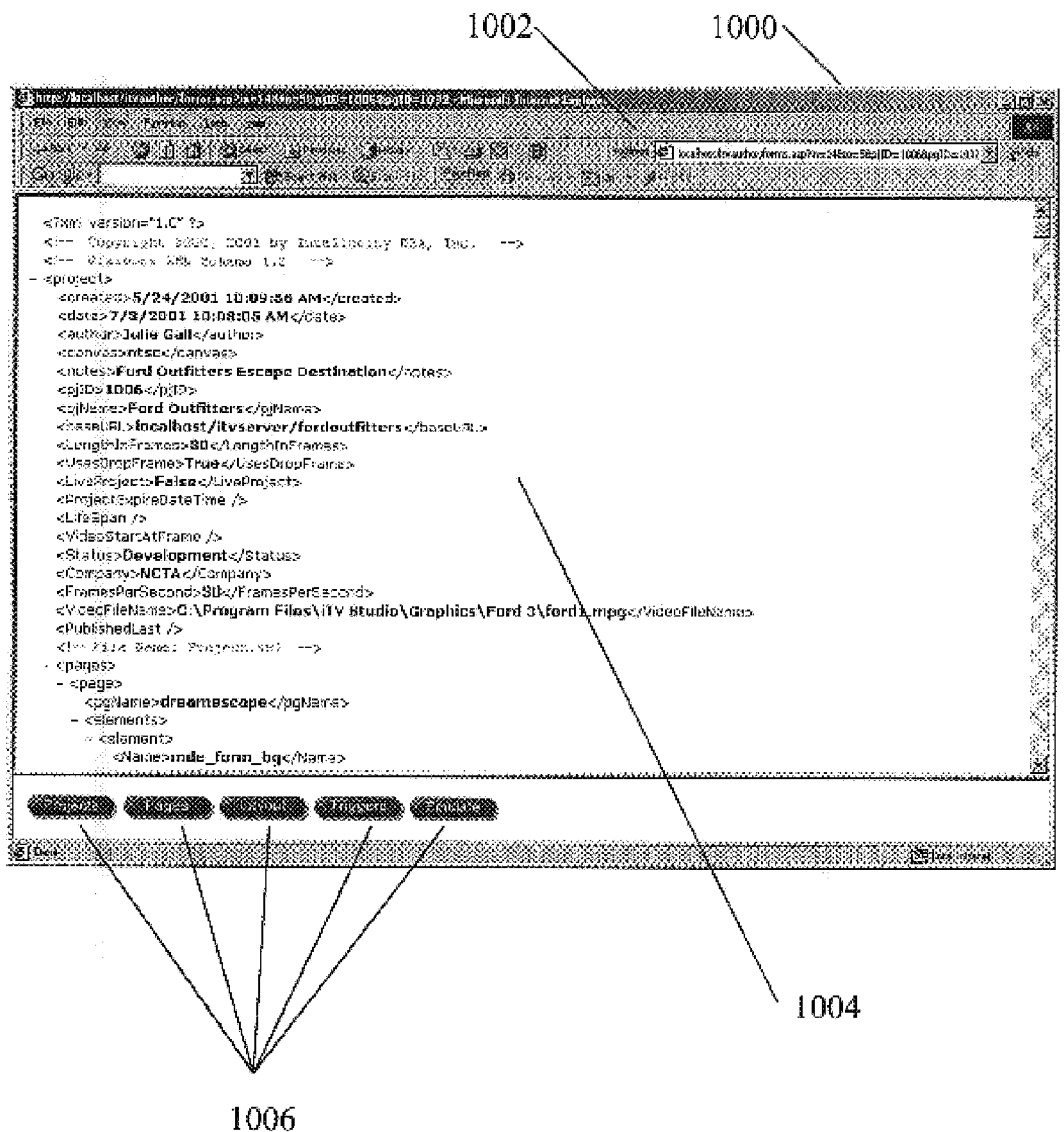
FIG. 10 depicts an XML screen.

FIG. 10 depicts an XML screen. XML screen 1000 may be accessed through URL 1002. Display area 1004 of XML screen 1000 provides a listing of the iTVML code generated.

Operationally, a user first opens the administration page of the present invention by employing a web browser accessing the URL of the administration page. The user may then log into the system, establish a new account, or view a tutorial. Once a user has provided a valid username and password, a projects page may be presented (Steve—is this how navigation is set up?). From the projects page the user may select a project to edit, view, publish or delete, or a new project may be started. If a new project is started, the user enters project information (as described in FIG. 5), including a video file and start frame information. The user may then select a navigation button on the lower portion of the screen to move to the pages screen. Using the pages screen, the user may select an existing page, copy an exiting page, delete an exiting page, or create a new page. The project name selected in the projects screen is displayed in the project window of the pages screen. A page name may be assigned to the new page, after which the user may navigate to the layout screen. The layout screen comprises a canvas area in which the video frame, identified in the projects screen, may be displayed. The properties box of the layout screen may be employed to select and position graphic, text, image, and imported executable elements within the canvas area. Advantageously, the present invention includes 'drag and drop' and 'resize' functions implemented at the user's browser. This provides the convenience and productivity of mouse (or other input device) driven editing without incurring delays that may result from network latencies or server workload. The 'drag and drop' and 'resize' functions are implemented as a Javascript downloaded to the user's browser as part of the layout screen. Flowcharts of the implementation of 'drag and drop' and 'resize' functions are presented in FIGS. 11 and 12. Appendix A provides an code listing for a Javascript implementation with numerical references to the flowchart functions.

Figure 11:
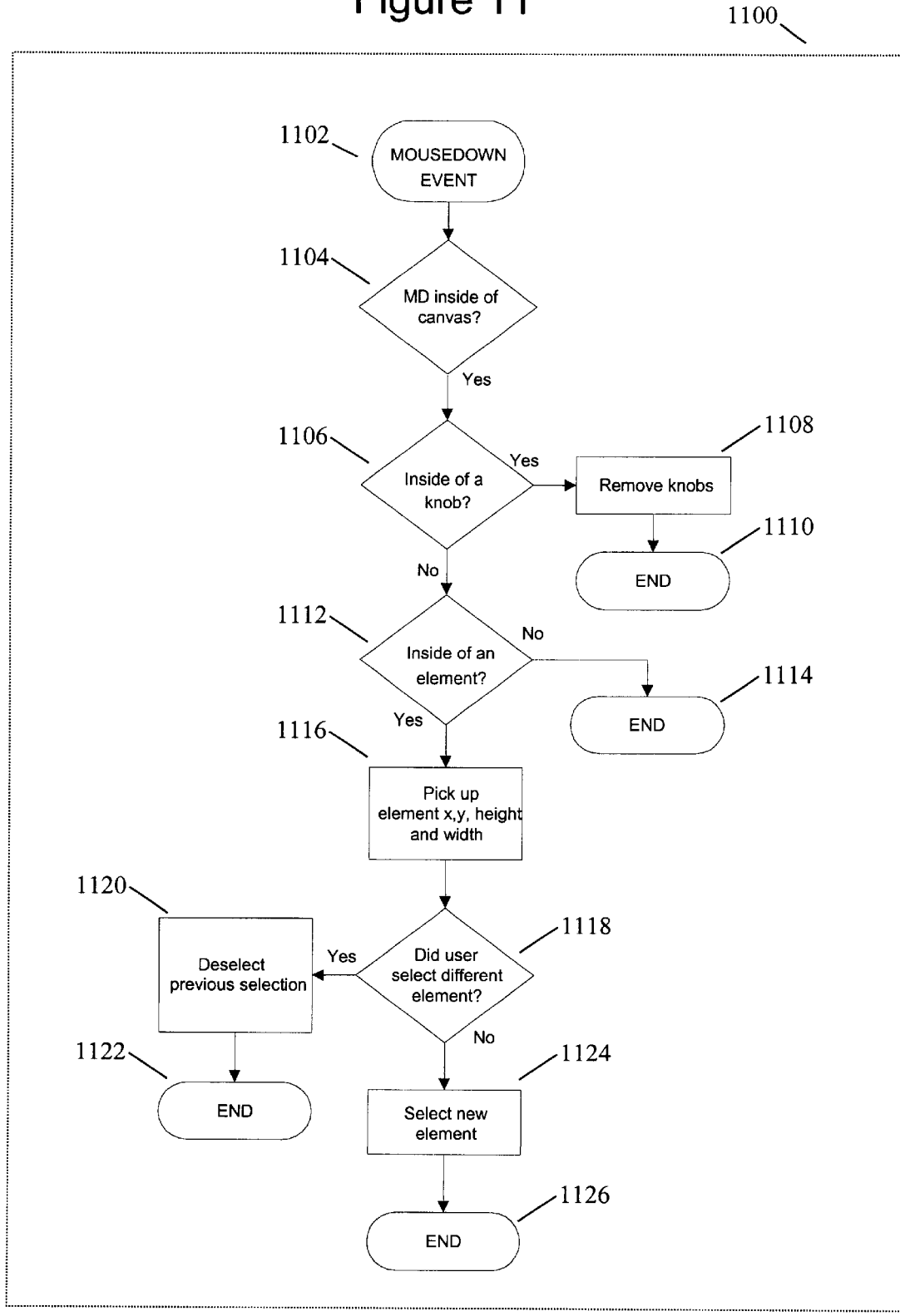
FIG. 11 is a flowchart of a method for selecting an element on the canvas of the layout screen.

FIG. 11 is a flowchart of a method for selecting an element on the canvas of the layout screen. Mouse select process 1100 begins with a mousedown (button activation) at step 1102. Step 1104 determines if the mouse position is inside the canvas when the button was activated. If the mouse position is outside the canvas area, mouse data is passed to other programs such as may be employed to select items within the properties box or other items contained in the layout screen. If the mouse position is inside the canvas, step 1106 determines if the position is inside the knobs of an element. Knobs are visual elements, such as small rectangles, for example, that are displayed at the edges of an element when selected. If the mouse is inside a knob, step 1108 removes the knobs and the process ends at step 1110. If step 1106 determines that the mouse position is not inside a knob, step 112 determines if the mouse position is inside an element. If the mouse position is not inside an element, the process ends at step 1114. If step 1112 determines that the mouse position is inside an element, step 1116 obtains the element's x and y position, height, and width. Step 1118 then determines if the user selected a different element. If a different element was selected, step 1120 deselects the previous selection and the process sends at step 1122. If the user did not select a difference element, the new element is selected at step 1124 and the process ends at step 1126.

Figure 12:
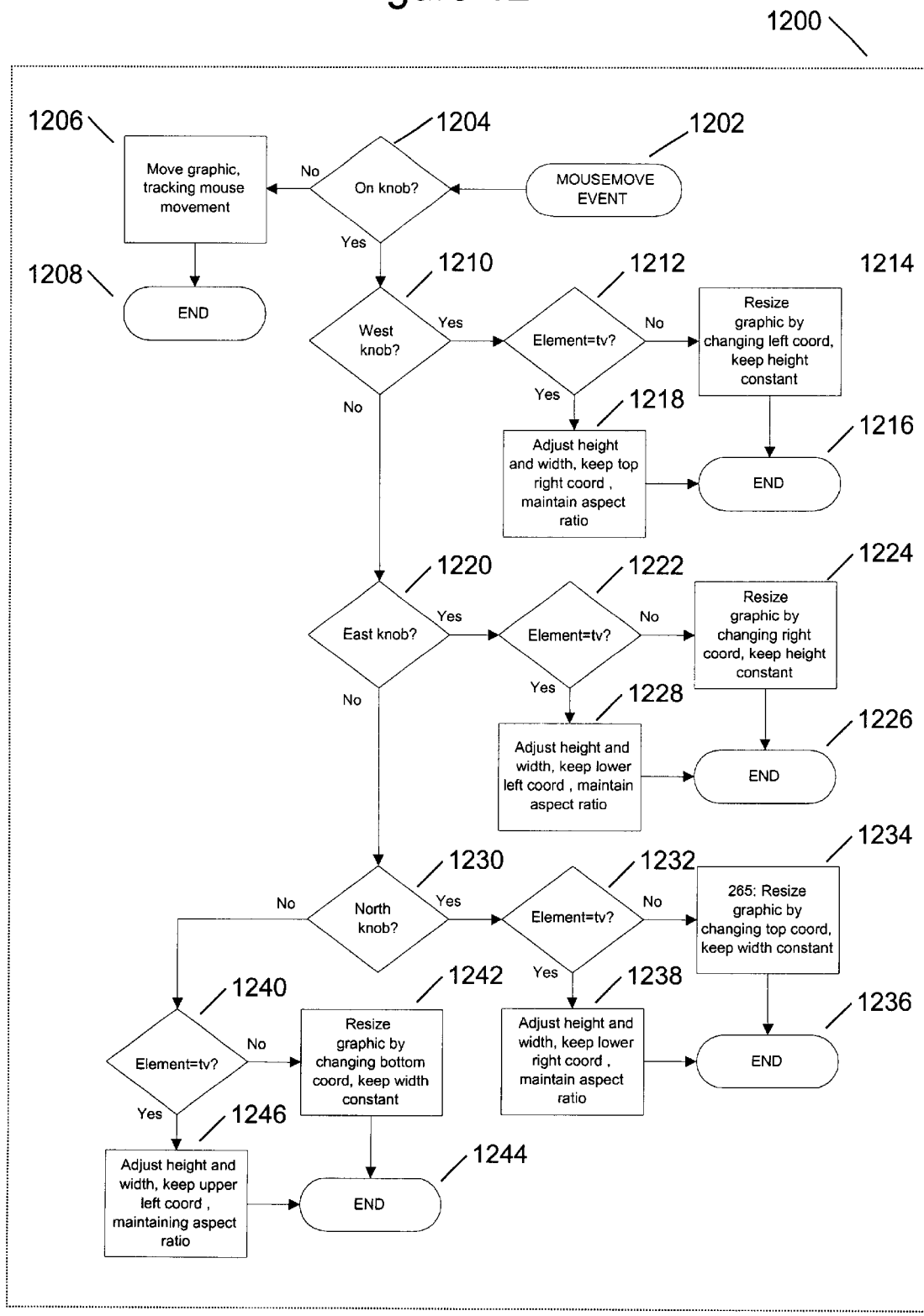
FIG. 12 is a flowchart of a method for moving and/or resizing an element on the canvas of the layout screen.

Having selected an element on the canvas of the layout screen using the process of FIG. 11, a user may now move or resize the element. FIG. 12 is a flowchart of a method for moving and/or resizing an element on the canvas of the layout screen. Move and resize process 1200 begins with step 1202 where a mousemove event is received. A mouse move event occurs when a mouse button is activated while the mouse is positioned over an element and the mouse is moved. Step 1204 determines if the mouse is positioned over a resize knob displayed in conjunction with a selected element. If step 1204 determines that the mouse position does not correspond to a knob, step 1206 moves the element using mouse movement information. The size of the element is not altered and processing ends at step 1208. If the position of the mouse corresponds to a knob of the element, step 1210 checks if the knob corresponds to a west (left side) knob. If the west knob is selected, step 1212 checks if the west knob is a lower left knob. If the knob is not the lower left knob, step 1214 resizes the element by changing the left coordinates of the element and keeping the right edge position and height of the element unchanged. Processing then ends at step 1216. If step 1212 determines that a lower left knob is selected, step 1218 adjusts the height and width of the element, maintaining the aspect ratio of the element and the position of the upper right corner of the element. Processing then ends at step 1216. If step 1210 determines that the west knob is not selected, step 1220 checks if the east knob (right side) was selected. If the east knob is selected, step 1222 checks if the east knob is an upper right knob. If the knob is not an upper right knob, step 1224 resizes the element by changing the right coordinates of the element and keeping the left edge position and height of the element unchanged. Processing then ends at step 1226. If step 1222 determines that an upper right knob is selected, step 1228 adjusts the height and width of the element, maintaining the aspect ratio of the element and the position of the lower left corner of the element. Processing then ends at step 1226. If step 1220 determines that an east knob is not selected, step 1230 checks if a north knob is selected. If a north knob is selected, step 1232 checks if the upper left knob was selected. If the upper left knob was not selected, step 1234 resizes the element by changing the top coordinates and keeping the bottom coordinates and width of the element unchanged. Processing then ends at step 1236. If step 1232 determines that the upper left knob was selected, step 1238 adjusts the height and width of the element while maintaining the aspect ratio of the element and the position of the bottom right coordinate. Processing then ends at step 1236. If step 1230 determines that a north knob was not selected, step 1240 checks if a lower right knob was selected. If a lower right knob was not selected, step 1242 adjusts the height of the element, keep the width and top coordinates unchanged. Processing then ends at step 1244. If step 1240 determines that the knob is a lower right knob, step 1246 adjusts the height and width of the element while maintaining the aspect ratio of the element and the position of the top left coordinate. Processing then ends at step 1244. Appendix A lists code to implement the 'drag and drop' and 'resize' functions described in FIG. 11 and FIG. 12.

After the user has placed elements on the canvas, positioned them at desired locations and sized them to desired sizes, the user may select the emulation screen to view the appearance of the enhanced frame or sequence of frames. Selecting the emulate function from the navigation buttons performs the following functions. First, the database entries associated with the current layout are accessed and a flat file of extended XML, called iTVML, is produced. The iTVML file is then passed through an emulation XSL parser that converts the iTVML into HTML and Javascript that is then sent to the user's browser to produce the emulation display.

The iTVML file is an XML compliant file with tags for the information contained in the project, layout, and triggers screens. The iTVML file is produced by retrieving information from the database, comparing each entry to a table of entries for that screen, and 'encapsulating' the entries with XML compliant formatting.

Figure 13:
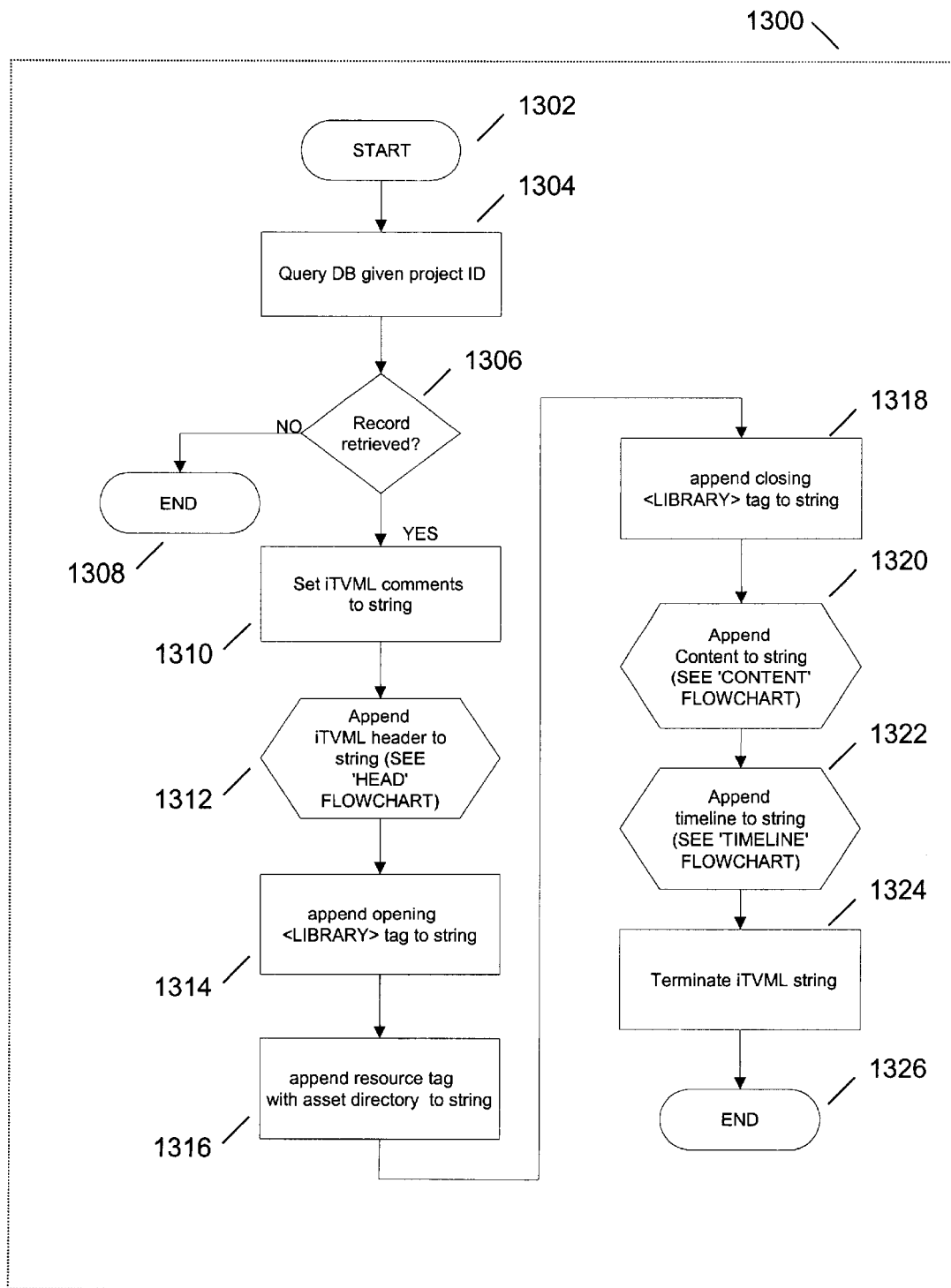
FIG. 13 depicts an iTVML generation process.

FIG. 13 depicts an iTVML generation process. The iTVML process 1300 starts at step 1302. At step 1304, the database is queried using the project ID. Step 1306 determines if any records are retrieved. If no records corresponding to the project ID are found, the process ends at step 1308. If a record corresponding to the project ID is retrieved, step 1310 sets the iTVML comments to string. Step 1312 appends an iTVML header to the string. The iTVML header may be generated as described in FIG. 14. Continuing with FIG. 13, step 1314 appends a library opening to the string. At step 1316, a resource tag identifying the asset directory is appended to the string. At step 1318 a library closing is appended to the string. At step 1320 content information is appended to the string. Content information may be generated through the process described in FIG. 15. Continuing with FIG. 13, step 1322 appends timeline information to the string. Timeline information may be generated through a process described in FIG. 16. Continuing with FIG. 13, step 1324 terminates the string and the process ends at step 1326. The iTVML process 1300 may be viewed as a process that assembles (in a string format compliant with XML), information defining where assets may be located, plus appends information from the projects, layout and triggers screens.

Figure 14:
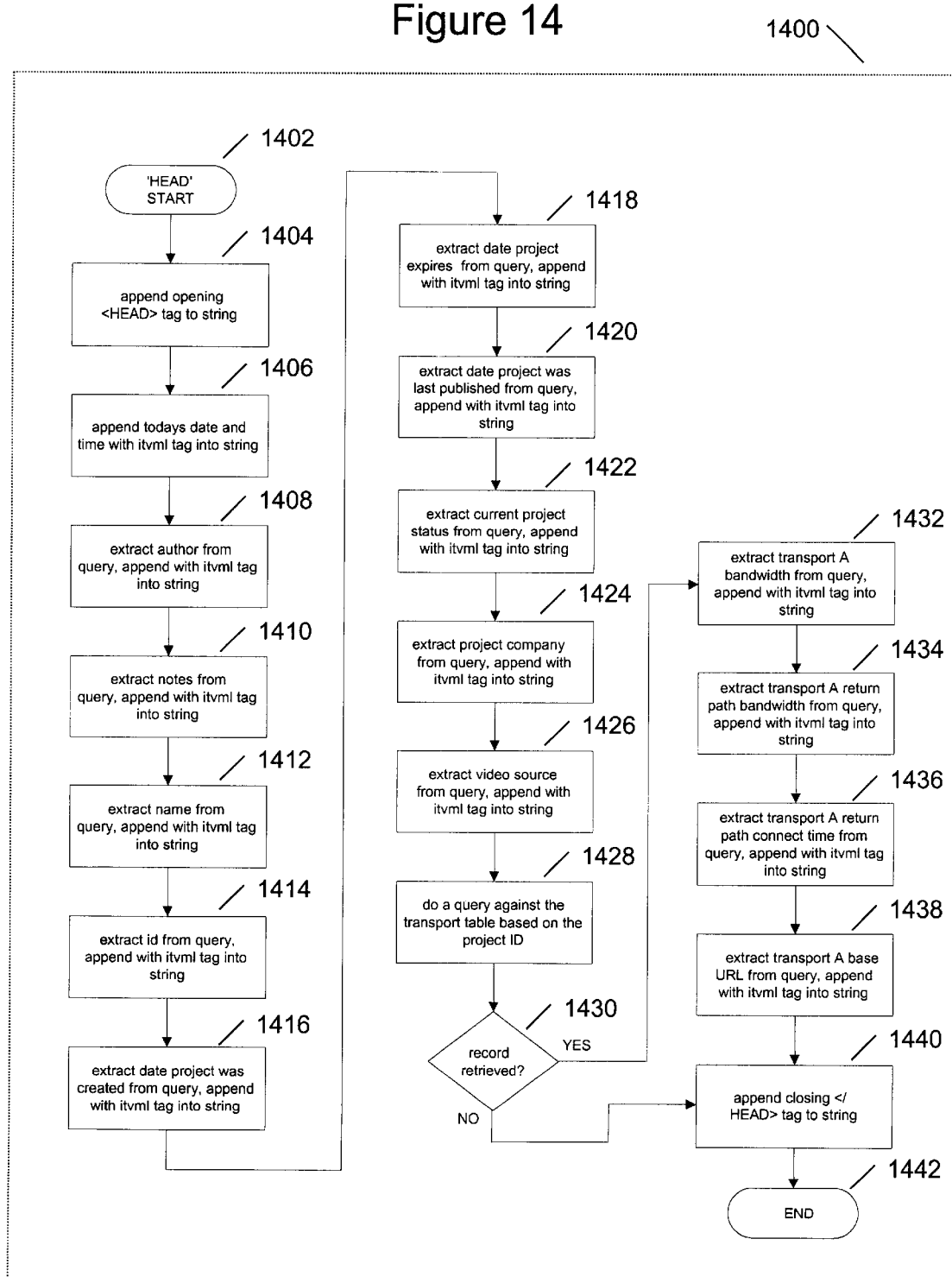
FIG. 14 depicts a process for creating an XML compliant string containing header information.

FIG. 14 depicts a process for creating an XML compliant string containing header information. Header process 1400 begins at step 1402. At step 1404, an opening tag, such as '<HEAD>', is appended to the string. At step 1406 the current data and time with an iTVML current date and time tag are appended to the string. At step 1408, the author name with an iTVML author-name tag is appended to the string. At step 1410, notes are extracted from the database and are appended to the string with an iTVML notes tag. At step 1412, the name of the project is extracted from the database and is appended to the string with an iTVML project-name tag. At step 1414, the project ID is extracted form the database and appended to the string with an iTVML project-ID tag. At step 1416, the date the project was created is extracted from the database and appended to the string with an iTVML created-date tag. At step 1418, the data the project expires is extracted form the database and appended to the string with an iTVML project-expires tag. At step 1420, the date the project was last published is extracted from the database and appended to the string with an iTVML last-published tag. At step 1422, the current project status is extracted from the database and appended to the string with an iTVML project-status tag. At step 1424, the project-company is extracted form the database and appended to the string with an iTVML project company tag. At step 1426 the video source is extracted form the database and appended to the string with an iTVML video-source tag. At step 1428, a query is performed against the transport table based on the project ID. If no transport records are found, step 1440 appends a closing tag, such as '/<HEAD>', to the string and the process ends at step 1442. If step 1430 retrieves a transport record, step 1432 extracts transport A bandwidth from the record, appends the bandwidth information to the string with an iTVML transport-bandwidth tag. Step 1434 extracts the transport A return path bandwidth from the record and appends the return path bandwidth to the string with an iTVML return-bandwidth tag. Step 1436 extracts the transport A return path connect time from the record and appends the information to the string with an iTVML connect-time tag. Step 1438 extracts the transport A base URL from the record and appends the URL to the string with an iTVML base-URL tag. Step 1440 then appends a closing tag, such as '/<HEAD>', to the string and the process ends at step 1442. Header process 1400 may be viewed as a process that assembles (in a string format compliant with XML), information contained in the projects screen.

Figure 15:
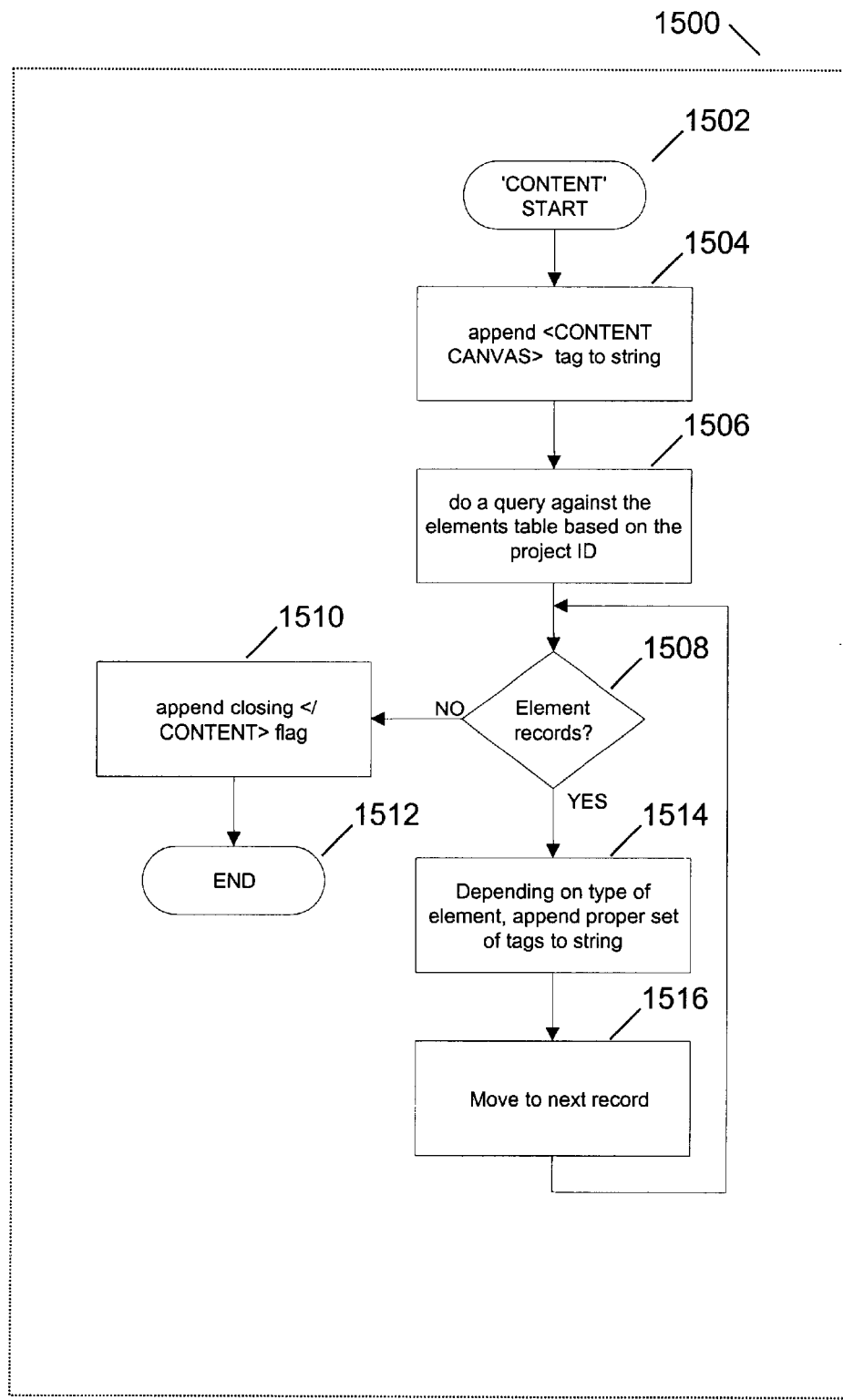
FIG. 15 depicts a process for creating an XML compliant content string.

FIG. 15 depicts a process for creating an XML compliant content string. Content process 1500 starts at step 1502. At step 1504, an opening tag, such as '<CONTENT>', is appended to the string. At step 1506, the database is queried for elements corresponding to the project ID. Step 1508 checks for element records. If no element records are found, step 1510 appends a closing flag, such as '/<CONTENT>', to the string and the process ends at step 1512. If step 1508 finds a record, step 1514 appends the record information to the string' searches a list of element types and appends an iTVML tag for the element type. Step 1516 then selects the next record and processing continues at step 1508. If no records remain, step 1510 appends a closing flag, such as '/<CONTENT>', to the string and the process ends at step 1512.

Figure 16:
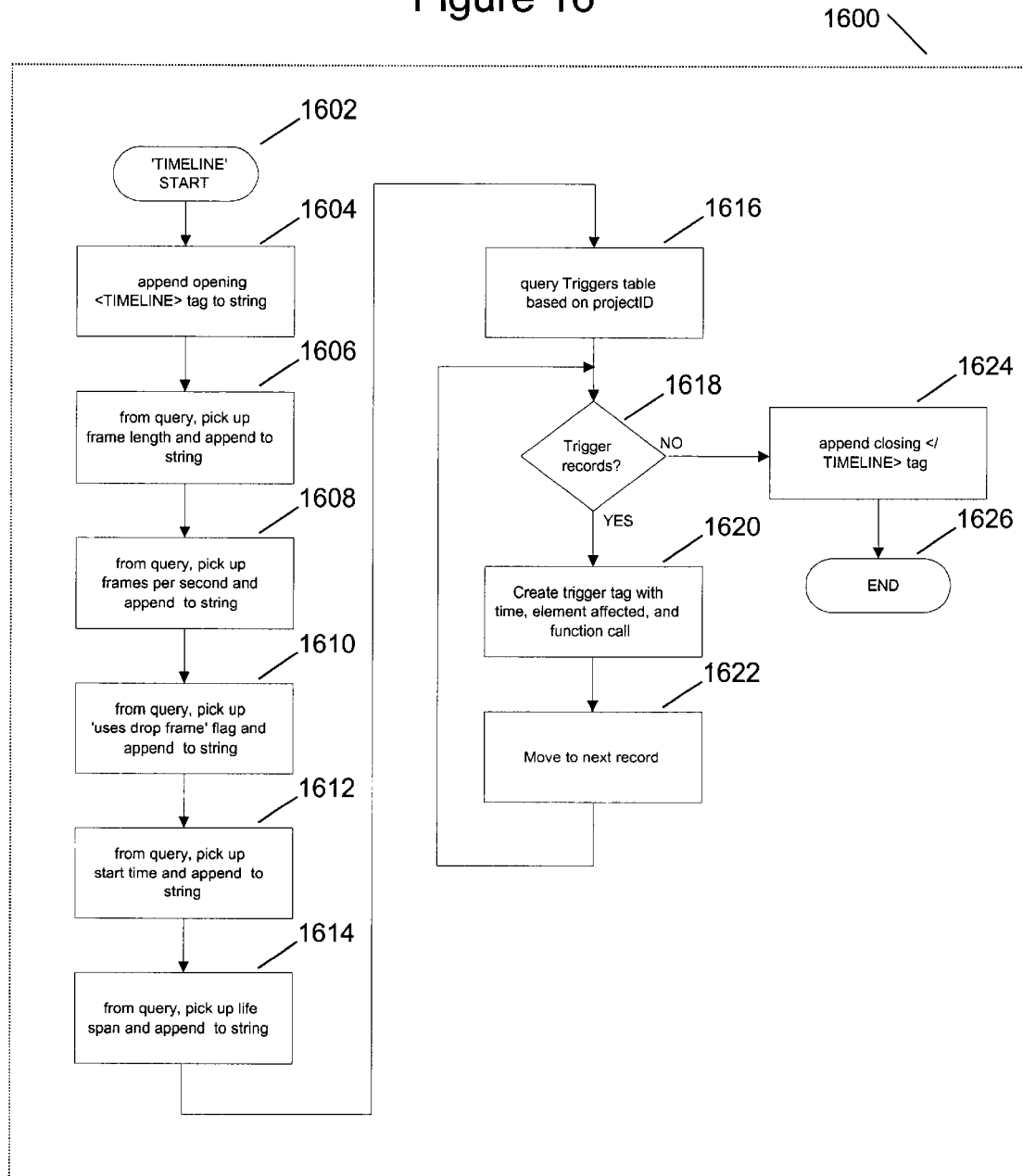
FIG. 16 depicts a process for creating an XML compliant timeline string.

FIG. 16 depicts a process for creating an XML compliant timeline string. Timeline process 1600 begins at step 1602. At step 1604 an opening tag, such as '<TIMELINE>', is appended to the string. At step 1606, frame length is extracted from the database and appended to the string. At step 1608, frames per second is extracted from the database and appended to the string. At step 1610, a 'uses drop frame' flag is extracted from the database and appended to the string. At step 1612, start time is extracted form the database and appended to the string. At step 1614, life span is extracted from the database and appended to the string. At step 1616, a triggers table is queried using the project ID. Step 1618 checks if trigger records exist. If no trigger records exist, step 1624 appends a closing tag, such as '</TIMELINE>', and processing ends at step 1626. If step 1618 finds a trigger record, step 1620 creates a trigger tag with the time, element affected, and function call. Step 1622 then moves to the next element. If step 1618 determines that no more elements exist, step 1624 appends a closing tag, such as '</TIMELINE>', and processing ends at step 1626.

FIGS. 13, 14, 15, and 16, depict a method in which database entries from the project, layout, and triggers screens may be processed to produce an iTVML file. Appendix B provides an example of the form and content of the iTVML file and illustrates the present invention's placement of database information within XML compliant tags. Once an iTVML file has been created, it may be parsed using industry standard XSL (Extensible Stylesheet Language) methods to produce HTML and Javascript that may be run on an industry standard web browser and media player such as Microsoft Internet Explorer and Windows Media Player, both from Microsoft Corporation. Additional information regarding XSL may be obtained from the following books:

Title: Professional XSL
Authors: Kurt Cagle et al.
Publisher: Wrox Press Inc;
ISBN: 1861003579
Title: XSL Companion, The
Author: Neil Bradley
Publisher: Addison-Wesley Pub Co;
ISBN: 0201674874

The iTVML file may also be parsed using a tool called iTV Publisher, that is the subject of a co pending patent application, to produce HTML or HTML and Javascript specific to platforms such as WEBTV™, AOLTV™ or other platforms.

Thus, the present invention provides an easy to use, rapid means for developing a layout for an enhanced presentation platform, such as a set top box or interactive television, which produces an output platform independent, text based, script file that completely defines the assets used (graphics, text, images, and imported executable files), including their positions and properties, and timing of their rendering. The platform independent nature of iTVML allows a single enhancement file to be created that then may be parsed to provide platform dependent enhancement files.

The foregoing description of the invention has been presented for purposes of illustration and description. It is not intended to be exhaustive or to limit the invention to the precise form disclosed, and other modifications and variations may be possible in light in the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

APPENDIX A—CODE EXAMPLE FOR CLICK & DRAG TO PLACE ELEMENTS AND TO RESIZE THEM

Note: Numerical references shown in bold after '//' relate the section of code to a component of the figures. The figures are representative of the actions performed and may not reflect the exact order or functions performed.

```
function mouseDown()    //1100
{
    //1104: Was the MouseDown inside of the DivPg(Canvas) ?
    if ( event.x >= divPg.offsetLeft + divMain.offsetLeft
        && event.x <= divPg.offsetLeft - 0 +
            divPg.offsetWidth +
divMain. offsetLeft
        && event.y >= divPg.offsetTop + divMain.offsetTop
        && event.y <= divPg.offsetTop - 0 +
            divPg.offsetHeight +
divMain.offsetTop )
    {
        // Yes.
        var el = event.srcElement;
        var pEl = el.parentElement;
        var i;
            var isText = false;
            //1106: Are we positioned inside a knob?
        if (el.id.indexOf ("_knob", 0) == 0)
        {
            // 1108 Yes, we are on a knob, and the user wants
                to resize
the element.
                initlX = event.clientX;
                initlY = event.clientY;
                knob = el;
                hideKnobs ();
                MouseDownOnElement = true;
        }
        else //1112:
        {
            while (true)
            {
                if (el.tagName =="BODY") return;
                if (pEl.tagName == "BODY") return;
                if (pEl.tagName == "DIV" &&
pEl.id.indexOf ("divEl")>=0) break;
                el = pEl;
                pEl = el.parentElement;
            }
            if (el.tagName == "DIV")
            {   // TEXT AREA
                ob = el.style;
            }
            else
            {
                ob = pEl.style;
            }
            //1116
            initlX = event.clientX;
            initlY = event.clientY;
            initlObjX = ob.posLeft;
            initlObjY = ob.posTop;
            elWidth = el.offsetWidth;
            elHeight = el.offsetHeight;
            elName = el.id;
            i = elName.slice(5);
            //1118: Did the user select a different element ?
            if (elementSelected == i)
            {
                MouseDownOnElement = true;
                // 1120: Change to newly selected element
                elementSelected = i;
                selectElement (i);
                hideKnobs();
            }
```

-continued

```
            else    //1124
            {
                var updated = true;
                //***** update display with selected element
                if (elementSelected > -1)
                {
                        updated = updEls (elementSelected);
                }
                if (updated)
                {
                    MouseDownOnElement = true;
                    // Change to newly selected element
                    elementSelected = i;
                    selectElement (i);
                    hideKnobs();
                }
            }
        }
    }
}
function mouseMove()    //1200
{
    if (MouseDownOnElement)
    {
        var fp = window.frmElProps;
        var pEl;
        var elType;
            if (knob) //1204
            {
                var e = eval ("window.elImg" + elementSelected);
                elType = parseInt (elements [elementSelected]
                [eElType]);
                if( elType == kElIsTA
                {
                    pEl = e;
                    e = e.style;
                }
                else
                {
                    pEl = e.parentElement;
                }
                var delta;
            switch (knob.style.cursor)
            {
                case "w-resize":    //1210
                {
                            delta = initlX - event.clientX;
                            if(elType != kElIsTV)    //
                    1212
                    {
                            if (pEl.style.pixelLeft -
                                delta <=0)
       //1218
                            {
                                delta =
                                pEl.style.pixelLeft;
                                pEl.style.pixelLeft = 0;
                            }
                            else
                            {
                                pEl.style.pixelLeft -=
                                delta;
                            }
                    }
                    switch( elType )   //1214
                    {
                        case kElIsGraphic:
                        case kElIsBG:
                            e.width += delta;
                            break;
                        case kElIsTA:
                            e.width =
Math.abs(parseInt (e.width) + delta) + "px";
                            break;
                        case kElIsTV:    //1218
                            // Compute available WEST
                            & South
```

```
                                    -continued
pixels
                              var Wpx =
                                pEl.style.pixelLeft;
                              var Spx = gCanvasH −
(pEl.style.pixelTop + e.height);
                              while( delta > Wpx ||
(gCanvasH/gCanvasW)*delta > Spx )
                              {
                                  --delta;
                                  if (delta == 0) break;
                                  pEl.style.pixelLeft −=
                              delta;
                                  e.width += delta;
                                  e.height = e.width *
(gCanvasH/gCanvasW);
                              break;
                            default:
                              break;
                          }
                      break;
                  }
                  case "e-resize":    //1220
                  {
                      var w;
                      delta = event.clientX − initlX;
                      switch( elType )  //1222
                      {
                          case kElIsGraphic:    //1224
                          case kElIsBG:
                              w = e.width + delta;
                              if( pEl.style.pixelLeft + w >
gCanvasW )
                              {
                                  w = gCanvasW −
pEl.style.pixelLeft;
                              }
                              e.width = w;
                              break;
                          case kElIsTA:    //1224
                              w = Math.abs
(parseInt (e.width) +
delta);
                              if( pEl.style.pixelLeft +
                              w >=
gCanvasW)
                              {
                                  w = gCanvasW −
pEl.style.pixelLeft;
                              }
                              e.width = w + "px";
                              break;
                          case kElIsTV:    //1228
                              // Compute available
                              EAST & South
pixels
                              var Epx = gCanvasW −
(pEl.style.pixelLeft + e.width);
                              var Spx = gCanvasH −
(pEl.style.pixelTop + e.height);
                              while ( delta > Epx ||
(gCanvasH/gCanvasW)*delta > Spx )
                              {
                                  --delta;
                                  if (delta == 0)
                                  break;
                              }
                              e.width += delta;
                              e.height = e.width *
(gCanvasH/gCanvasW);
                              break;
                            default:
                              break;
                          }
                      break;
                  }
```

```
                                    -continued
                  case "n-resize":    //1230
                  {
                      var h;
                      delta = initlY − event.clientY;
                      if (elType != kElIsTV)    //1232
                      {
                          if (pEl.style.pixelTop −
                          delta < 0)
                          {
                              delta =
                              pEl.style.pixelTop;
                              pEl.style.pixelTop = 0;
                          }
                          else
                          {
                              pEl.style.pixelTop −=
                              delta;
                          }
                      switch ( elType )    //1234
                      {
                          case kElIsGraphic:    //1238
                          case kElIsBG:
                              e.height += delta;
                              break;
                          case kElIsTA:    //1238
                              e.height =
Math.abs (parseInt (e.height) + delta) + "px";
                              break;
                          case kElIsTV:
                              // Compute available
                              NORTH & West
                              var Npx = pEl.style.pixelTop;
                              var Wpx = gCanvasW −
(pEl.style.pixelLeft + e.width);
                              while ( delta > Npx ||
(gCanvasW/gCanvasH) *delta > Wpx )
                              {
                                  --delta;
                                  if (delta == 0) break;
                              }
                              pEl.style.pixelTop −= delta;
                              e.height += delta;
                              e.width = e.height *
(gCanvasW/gCanvasH);
                              break;
                            default:
                              break;
                          }
                      break;
                  }
                  case "s-resize":
                  {
                      var h;
                      delta = event.clientY − initlY;
                      switch ( elType )    //1240
                      {
                          case kElIsGraphic:    //1242
                          case kElIsBG:
                              h = e.height + delta;
                              if ( pEl.style.pixelTop + h >
gCanvasH )
                              {
                                  h = gGanvasH −
pEl.style.pixelTop;
                              }
                              e.height = h;
                              break;
                          case kElIsTA:    //1242
                              h = Math.abs
(parseInt(e.height) +
delta);
                              if ( pEl.style.pixelTop + h >
gCanvasH )
                              {
                                  h = (gCanvasH −
```

-continued

```
pEl.style.pixelTop);
                                    }
                                    e.height = h + "px"
                                    break;
                                case kEllsTV:         //1246
                                    // Compute available
                                    SOUTH & West
pixels
                                    var Wpx = gCanvasW -
(pEl.style.pixelLeft + e.width)
                                    var Spx = gCanvasH -
(pEl.style.pixelTop + e.height);
                                    while ( delta > Spx ||
(gCanvasW/gCanvasH) *delta > Wpx )
                                    {
                                        --delta;
                                        if (delta == 0) break;
                                    }
                                    e.height += delta;
                                    e.width = e.height *
(gCanvasW/gCanvasH);
                                    break;
                                default:
                                    break;
                            } // switch ( elType )
                            break;
                    } // case s-resize:
                } // switch ( knob.style.cursor )
                var el = elements [elementSelected]; //1206
                fp.txtLeft.value = el [eElLeft]   =
pEl.style.pixelLeft;
                fp.txtTop.value = el [eElTop]    = pEl.style.pixelTop;
                fp.txtWidth.value = el [eElWidth]= (elType ==
                    kEllsTA ?
parseInt (e.width) : e.width);
                fp.txtHeight.value = el [eElHeight] = (elType ==
                    kEllsTA ?
parseInt (e.height) : e.height);
            }
            if (ob)
            {
                if (ob.pixelLeft + event.clientX - initlX < 0)
                    ob.pixelLeft = 0;
                else
                    ob.pixelLeft += event.clientX - initlX;
                if (ob.pixelLeft + elWidth + event.clientX -
                    initlX >
window.divPg.clientWidth)
                    ob.pixelLeft = window.divPg.clientWidth -
                        elWidth;
                if (ob.pixelTop + event.clientY - initlY < 0)
                    ob.pixelTop = 0;
                else
                    ob.pixelTop += event.clientY - initlY;
                if (ob.pixelTop + elHeight + event.clientY -
                    initlY >
window.divPg.clientHeight)
                    ob.pixelTop = window.divPg.clientHeight -
                        elHeight;
                fp.txtLeft.value = elements [elementSelected]
                    [eElLeft] =
ob.pixelLeft;
                fp.txtTop.value = elements [elementSelected]
                    [eElTop] =
ob.pixelTop;
            }
            initlX = event.clientX;
            initlY = event.clientY;
        }
        return false;
    }
}
```

What is claimed is:

1. A method of creating a television presentation enhancement comprising:
   accessing a browser based authoring package through an administration screen;
   establishing project information for said enhancement;
   defining a window in a graphical user interface contained in a browser;
   placing a displayable element at a position in said window;
   defining a time when said displayable element may be rendered;
   employing a database to store information describing said displayable element, and said time;
   creating a platform independent television enhancement file containing information related to said displayable element, and said time;
   parsing said platform independent television enhancement file to produce an HTML file for a specific television platform; and
   viewing said HTML file.

2. The method of claim 1 wherein said step placing a displayable element further comprises:
   employing a software routine, downloaded to said web browser, to locally alter the position of said element in response to input from a pointing device.

3. The method of claim 1 wherein said element comprises an imported HTML file.

4. The method of claim 1 wherein said step placing a displayable element further comprises:
   employing a software routine, downloaded to said web browser, to locally alter the size of said element in response to input from a pointing device.

5. The method of claim 1 wherein said step of placing a displayable element further comprises:
   defining a z order for said element.

6. The method of claim 1 wherein said step of placing a displayable element further comprises:
   associating a link with said displayable element.

7. The method of claim 1 wherein said platform independent television enhancement file is an XML file.

8. The method of claim 1 wherein said step of parsing further comprises:
   applying an XSL transformation to an XML file.

9. The method of claim 1 wherein said step of parsing further comprises:
   writing Javascript in said HTML file.

10. The method of claim 1 further comprising:
    emulating said enhancement in said browser window prior to saving said enhancement file.

11. The method of claim 1 further comprising:
    employing a change attribute function to alter an attribute of a previously defined element.

12. A method for creating a television presentation enhancement comprising:
    selecting a video image for enhancement;
    defining a window in a graphical user interface contained in a web browser;
    displaying a video window in said window in said graphical user interface;
    placing a displayable element at a position in said window in said graphical user interface;
    defining a time when said displayable element may be rendered;
    employing a database to store information describing said video image, said displayable element, and said time;
    creating a platform independent television enhancement file containing information related to said video image, said displayable element, and said time; and parsing said platform independent television enhancement file to produce an HTML file for a specific television platform.

13. The method of claim 12 further comprising:
displaying said HTML file in a web browser containing said video window.

14. The method of claim 12 further comprising:
saving said HTML file to said database.

15. The method of claim 12 wherein said step of parsing further comprises:
applying an XSL transformation to said television enhancement file to produce a television platform specific file.

16. The method of claim 12 wherein said platform independent television enhancement file is an XML file.

17. The method of claim 12 wherein said step placing a displayable element further comprises:
employing a software routine, downloaded to said web browser, to locally alter the position of said element in response to input from a pointing device.

18. The method of claim 12 wherein said displayable element comprises an imported HTML file.

19. The method of claim 12 wherein said step placing a displayable element further comprises:
employing a software routine, downloaded to said web browser, to locally alter the size of said element in response to input from a pointing device.

20. The method of claim 12 wherein said step of placing a displayable element further comprises:
defining a z order for said element.

21. The method of claim 12 wherein said step of placing a displayable element further comprises:
associating a link with said displayable element.

22. The method of claim 12 wherein said step of parsing further comprises:
writing Javascript in said HTML file.

23. The method of claim 12 further comprising:
emulating said enhancement in said browser window prior to saving said enhancement file.

24. The method of claim 12 further comprising:
employing a change attribute function to alter an attribute of a previously defined element.

25. A system for creating television enhancements comprising:
a project interface that contains project information for said enhancements;
a graphical user interface implemented in a browser environment;
a rectangular area defined in said browser environment;
a user interface that places a displayable element in said rectangular area;
a user interface that specifies a time at which said displayable element may be rendered;
a database that stores information associated with said displayable element and information associated with said time;
a user interface that allows an attribute of said displayable element to be changed at a specified time;
a pointing device;
a user interface that initiates generation of an XML file containing tags for said information associated with said displayable element and said information associated with said time; and
a parsing program that produces an output file for a specific television platform.

26. The system of claim 25 wherein said user interface further comprises:
a drag and drop function implemented locally in said browser environment that allows said displayable element to be positioned in response to signals from said pointing device.

27. The system of claim 25 wherein said user interface for placing a displayable element further comprises:
a resize function implemented locally in said browser environment that allows said displayable element to be altered in size in response to signals from said pointing device.

28. The system of claim 25 further comprising:
a user interface for that applies an XSL translation to said XML file to produce an HTML file for a specific television platform.

29. The system of claim 26 further comprising:
an emulation function operable to display said HTML file and a television image in said browser prior to saving said HTML file.

30. A television enhancement file embodied in a machine readable medium generated by the steps of:
employing a browser accessed graphical user interface to position a displayable element in a position relative to a television image area in a browser window;
specifying a time at which said displayable element may be rendered;
storing information associated with said displayable element, said information associated with said position, and said time in a database;
generating an XML file using said information stored in said database; and
applying an XSL translation to said XML file to produce a television platform specific file.

31. The television enhancement file of claim 30 further comprising the step:
specifying a z order for said element.

32. The television enhancement file of claim 30 wherein said user interface further comprises:
a drag and drop function implemented locally in said browser environment that allows said displayable element to be positioned in response to signals from a pointing device.

33. The television enhancement file of claim 30 wherein said user interface further comprises:
a resize function implemented locally in said browser environment that allows said displayable element to be altered in size in response to signals from a pointing device.

34. A web based television enhancement authoring program, embodied in a machine readable medium that operates in a web browser comprising:
an administration screen providing user access;
a projects screen containing project information;
a database screen providing storage and retrieval of enhancement projects;
a layout screen that provides selection, placement, and resizing of displayable elements, that provides changing of an attribute associated with a displayable element, and that includes a drag and drop function and a resizing function implemented locally in said web browser;

a triggers screen that synchronizes rendering of an enhancement with an event;

an emulation screen that provides display of said enhancement and a video image in said browser window prior to saving said enhancement; and a parsing module that parses a platform independent enhancement file to produce an enhancement file for a specific television platform.

35. The method of claim 1 wherein said project information comprises a client name.

36. The method of claim 1 wherein said project information comprises an identifier of a video file.

37. The method of claim 1 wherein said project information comprises a file to which said enhancement may be published.

* * * * *